(12) United States Patent
Wang et al.

(10) Patent No.: US 11,463,998 B2
(45) Date of Patent: Oct. 4, 2022

(54) WIRELESS COMMUNICATION METHOD, WIRELESS COMMUNICATIONS APPARATUS, AND WIRELESS COMMUNICATIONS SYSTEM

(71) Applicant: HUAWEI TECHNOLOGIES CO., LTD., Guangdong (CN)

(72) Inventors: Tingting Wang, Shenzhen (CN); Qinghai Zeng, Shanghai (CN); Qufang Huang, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 40 days.

(21) Appl. No.: 16/728,343

(22) Filed: Dec. 27, 2019

(65) Prior Publication Data

US 2020/0137735 A1    Apr. 30, 2020

Related U.S. Application Data

(63) Continuation of application No. PCT/CN2018/093462, filed on Jun. 28, 2018.

(30) Foreign Application Priority Data

Jun. 30, 2017 (CN) .......................... 201710527967.9

(51) Int. Cl.
   *H04W 72/04* (2009.01)
(52) U.S. Cl.
   CPC ................................. *H04W 72/042* (2013.01)
(58) Field of Classification Search
   CPC .................................................... H04W 72/042
   See application file for complete search history.

(56) References Cited

U.S. PATENT DOCUMENTS

| | | | |
|---|---|---|---|
| 2011/0268028 A1* | 11/2011 | Stern-Berkowitz | ......................... H04L 5/0048 |
| 2013/0170406 A1* | 7/2013 | Kishiyama | ............ H04L 1/0026 |
| 2016/0037492 A1 | 2/2016 | Xu et al. | |
| 2016/0192331 A1* | 6/2016 | Liang | .................... H04W 24/10 |
| 2016/0249337 A1 | 8/2016 | Liang et al. | |
| 2016/0295561 A1 | 10/2016 | Papasakellariou | |
| 2017/0230994 A1* | 8/2017 | You | ..................... H04W 72/042 |
| 2019/0357182 A1* | 11/2019 | Liu | ........................ H04L 5/0053 |

(Continued)

FOREIGN PATENT DOCUMENTS

| | | |
|---|---|---|
| CN | 102111851 A | 6/2011 |
| CN | 104104468 A | 10/2014 |

(Continued)

*Primary Examiner* — Ronald B Abelson
(74) *Attorney, Agent, or Firm* — Womble Bond Dickinson (US) LLP

(57) ABSTRACT

This application discloses a wireless communication method, a wireless communications apparatus, and a wireless communications system. The wireless communication method includes: receiving, by a terminal, downlink configuration information from a base station, where the downlink configuration information is used to indicate a configuration of a downlink control message, the configuration of the downlink control message includes a format of the downlink control message, and the downlink control message is used to carry service data to be transmitted to the terminal; and receiving, by the terminal, the downlink control message from the base station based on the configuration of the downlink control message.

18 Claims, 6 Drawing Sheets

(56) References Cited

U.S. PATENT DOCUMENTS

2020/0107355 A1* 4/2020 Zhou ................. H04W 72/1278
2020/0137729 A1* 4/2020 Tang ..................... H04L 5/0094

FOREIGN PATENT DOCUMENTS

| CN | 104349460 A | 2/2015 |
| CN | 104519515 A | 4/2015 |
| CN | 106301696 A | 1/2017 |
| EP | 3051862 A1 | 8/2016 |
| WO | 2015006939 A1 | 1/2015 |

* cited by examiner

WIRELESS COMMUNICATION METHOD, WIRELESS COMMUNICATIONS APPARATUS, AND WIRELESS COMMUNICATIONS SYSTEM

CROSS-REFERENCE TO RELATED APPLICATIONS

This application is a continuation of International Application No. PCT/CN2018/093462, filed on Jun. 28, 2018, which claims priority to Chinese Patent Application No. 201710527967.9, filed on Jun. 30, 2017. The disclosures of the aforementioned applications are hereby incorporated by reference in their entireties.

TECHNICAL FIELD

This application relates to the field of communications technologies, and specifically, to a wireless communication method, a wireless communications apparatus, and a wireless communications system.

BACKGROUND

Currently, in research on a 5th generation (5G) mobile communications system, an expected service scenario is ultra-reliable low-latency communication (URLLC). Performance indicators expected in the URLLC service scenario include a data transmission latency that is less than 0.5 millisecond and a data transmission success rate that is greater than or equal to 99.999%. These values of the performance indicators related to the latency and reliability are significantly better than those in a current 4th generation (4G) mobile communications system, and the performance indicator values cannot be met in the prior art.

In view of this, it is necessary to provide a new technical solution to improve service reliability or reduce a service latency.

SUMMARY

With reference to a plurality of implementations, the present invention provides a wireless communication method, a wireless communications apparatus, and a wireless communications system, to improve service reliability and/or reduce a service latency.

It should be understood that, the term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

According to a first aspect, a wireless communication method is provided. The wireless communication method may be performed by a terminal. The wireless communication method includes:

receiving downlink configuration information from a base station, where the downlink configuration information is used to indicate a configuration of a downlink control message, the configuration of the downlink control message includes a format of the downlink control message, and the downlink control message is used to carry service data to be transmitted to the terminal; and receiving the downlink control message from the base station based on the configuration of the downlink control message.

According to a second aspect, a wireless communications apparatus is provided. The wireless communications apparatus may be a terminal. The wireless communications apparatus includes:

a processor and a receiver connected to the processor, where the receiver is configured to:

receive downlink configuration information from a base station, where the downlink configuration information is used to indicate a configuration of a downlink control message, the configuration of the downlink control message includes a format of the downlink control message, and the downlink control message is used to carry service data to be transmitted to the terminal; and receive the downlink control message from the base station based on the configuration of the downlink control message.

According to a third aspect, a wireless communications apparatus is provided. The wireless communications apparatus may be a terminal (or a chip or a system-on-a-chip disposed in the terminal). The wireless communications apparatus includes: a memory, a processor, and a computer program that is stored in the memory and can be run on the processor, where when the processor runs the computer program, the wireless communications apparatus (or the terminal) is enabled to:

receive downlink configuration information from a base station, where the downlink configuration information is used to indicate a configuration of a downlink control message, the configuration of the downlink control message includes a format of the downlink control message, and the downlink control message is used to carry service data to be transmitted to the terminal; and receive the downlink control message from the base station based on the configuration of the downlink control message.

According to a fourth aspect, a wireless communication method is provided. The wireless communication method may be performed by a base station. The wireless communication method includes:

sending downlink configuration information to a terminal, where the downlink configuration information is used to indicate a configuration of a downlink control message, the configuration of the downlink control message includes a format of the downlink control message, and the downlink control message is used to carry service data to be transmitted to the terminal; and sending the downlink control message to the terminal based on the configuration of the downlink control message.

According to a fifth aspect, a wireless communications apparatus is provided. The wireless communications apparatus may be a base station. The wireless communications apparatus includes:

a processor and a transmitter connected to the processor, where the transmitter is configured to:

send downlink configuration information to a terminal, where the downlink configuration information is used to indicate a configuration of a downlink control message, the configuration of the downlink control message includes a format of the downlink control message, and the downlink control message is used to carry service data to be transmitted to the terminal; and send the downlink control message to the terminal based on the configuration of the downlink control message.

According to a sixth aspect, a wireless communications apparatus is provided. The wireless communications apparatus may be a base station (or a chip or a system-on-a-chip disposed in the base station). The wireless communications apparatus includes: a memory, a processor, and a computer program that is stored in the memory and can be run on the processor, where when the processor runs the computer program, the wireless communications apparatus (or the base station) is enabled to:

send downlink configuration information to a terminal, where the downlink configuration information is used to indicate a configuration of a downlink control message, the configuration of the downlink control message includes a format of the downlink control message, and the downlink control message is used to carry service data to be transmitted to the terminal; and send the downlink control message to the terminal based on the configuration of the downlink control message.

In one embodiment, some information fields of the downlink control message are used to carry the service data to be transmitted to the terminal, and another information field of the downlink control message is used to carry layer 1 or layer 2 control signaling.

In one embodiment, the layer 1 or layer 2 control signaling carried in the another information field of the downlink control message includes an identifier of a data radio bearer, and the service data carried in the downlink control message belongs to the data radio bearer.

In one embodiment, the configuration, indicated by the downlink configuration information, of the downlink control message further includes: the identifier of the data radio bearer and a candidate subframe corresponding to the data radio bearer, where the candidate subframe is used to transmit the downlink control message, and the service data carried in the downlink control message belongs to the data radio bearer.

In one embodiment, the configuration, indicated by the downlink configuration information, of the downlink control message further includes: the identifier of the data radio bearer and a candidate check identifier corresponding to the data radio bearer, where the candidate check identifier is used to check the downlink control message, and the service data carried in the downlink control message belongs to the data radio bearer.

In one embodiment, the configuration, indicated by the downlink configuration information, of the downlink control message further includes: the identifier of the data radio bearer and a candidate air interface parameter corresponding to the data radio bearer, where the candidate air interface parameter is used to determine a detection region of the downlink control message, and the service data carried in the downlink control message belongs to the data radio bearer.

In one embodiment, the configuration, indicated by the downlink configuration information, of the downlink control message further includes: the identifier of the data radio bearer and a candidate starting index corresponding to the data radio bearer, where the candidate starting index is used to determine a starting position of the detection region of the downlink control message, and the service data carried in the downlink control message belongs to the data radio bearer.

In one embodiment, the configuration, indicated by the downlink configuration information, of the downlink control message further includes: the identifier of the data radio bearer and a candidate quantity of detection times corresponding to the data radio bearer, where the candidate quantity of detection times is used to determine a maximum quantity of detection times of the downlink control message, and the service data carried in the downlink control message belongs to the data radio bearer.

According to a seventh aspect, a wireless communications system is provided, and includes a base station, and any one of the wireless communications apparatuses in the second aspect, the third aspect, and the various embodiments.

According to an eighth aspect, a wireless communications system is provided, and includes a terminal, and any one of the wireless communications apparatuses in the fifth aspect, the sixth aspect, and the various embodiments.

According to a ninth aspect, a computer-readable storage medium is provided, where the computer-readable storage medium stores program code; and when the program code is executed by a processor, any one of the methods in the first aspect, the fourth aspect, and the various embodiments is implemented.

According to a tenth aspect, a computer program product is provided, where when program code stored in the computer program product is executed by a processor, any one of the methods in the first aspect, the fourth aspect, and the various embodiments is implemented.

In the technical solution in any one of the foregoing aspects, the downlink control message is used to carry the service data to be transmitted to the terminal. After receiving the downlink control message, the terminal can obtain the service data carried in the downlink control message. Therefore, the technical solution in any one of the foregoing aspects helps improve the service reliability and reduce the service latency. The technical solution, further combined with the various embodiments, helps further reduce computational overheads and/or reduce the service latency.

Figure 1:
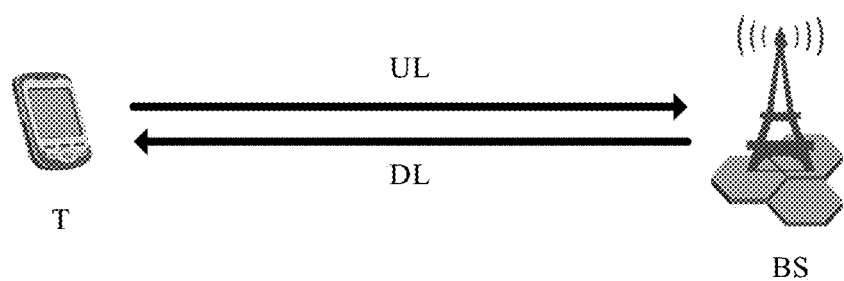
FIG. 1 is a schematic structural diagram of a wireless communications system according to an embodiment of the present invention.

It should be understood that, in the foregoing schematic structural diagrams, sizes and forms of modules are for reference only, and should not constitute a unique interpretation of embodiments of the present invention. A relative position between the modules shown in the schematic structural diagrams only schematically represents a structural association between the modules, rather than limiting a physical connection manner in the embodiments of the present invention.

DESCRIPTION OF EMBODIMENTS

The following further describes technical solutions provided in this application with reference to the accompanying drawings and embodiments. It should be understood that system architectures and service scenarios described in this application are mainly used to describe possible implementations of the technical solutions of this application, and should not be construed as a unique limitation on the technical solutions of this application. A person of ordinary skill in the art may know that, with evolution of the network architectures and emergence of new service scenarios, the technical solutions provided this application are also applied to a similar technical problem.

In a wireless communications system, communications devices may be classified into a device that provides a network service and a device that uses a network service. The communications device that provides the network service is generally devices that form a network, and may be referred to as a network device (network equipment) or a network element for short. The network device generally belongs to network vendors, for example, operators (such as China Mobile and Vodafone) or infrastructure providers (such as China Tower), and is operated and maintained by the network vendors. A communications device that uses a network service is usually located on an edge of a network, and may be referred to as a terminal for short. The terminal can connect to the network device and uses a service provided by the network device, but do not necessarily belong to the network vendors. The terminal is generally closely associated with users, and is sometimes referred to as user equipment (UE), or a subscriber unit (SU).

Using a mobile communications system as an example, a typical example of the terminal is a mobile phone. The mobile phone usually belongs to a user, can access a mobile communications network, and uses a mobile communication service provided by the network. The mobile communications network may further include a radio access network (RAN) and a core network (CN). Correspondingly, the network device may further include a RAN device and a CN device. The RAN device is mainly responsible for radio-related functions. A typical example is a next generation node B (gNB) in a 5G system, and an evolved node B (eNB or eNodeB) in a 4G system. The CN device is mainly responsible for overall functions of the network, and generally includes a user plane (UP) device and a control plane device. The user plane is mainly used for transmitting user data. The user data is usually considered as a payload of a communication service, for example, data content, such as a text, a voice, or a video, that meets a user requirement. In this application, user plane data or the user data is denoted as service data. The control plane is mainly used for transmitting control signaling. The control signaling is auxiliary overheads of service data transmission, but the control signaling is crucial to ensure efficiency and reliability of the service data transmission.

In this application, for ease of description, the following describes a wireless communication method, device, and system in the embodiments of the present invention in detail by using a base station and the terminal as examples. The base station refers to the network device in the wireless communication system, especially the RAN device. In addition to the UE or the SU in the wireless communication system, the terminal further includes a communications device that has a radio access capability similar to that of the UE or the SU, for example, the network device such as a relay node (RN). Generally, according to a data transmission direction on a communication link, a communication link from the base station to the terminal is referred to as a downlink (DL). Conversely, a communication link from the terminal to the base station is referred to as an uplink (UL).

From a perspective of a logic function, the base station may be understood as a scheduling entity, and the terminal may be understood as a subordinate entity. The scheduling entity is responsible for scheduling and controlling the service data transmission, and the subordinate entity performs the service data transmission based on control of the scheduling entity. For example, the base station sends an uplink scheduling grant to the terminal, and the terminal sends uplink data transmission to the base station based on the uplink scheduling grant.

From a perspective of a physical form, the base station may include but is not limited to a macro base station, a micro base station, a transmission reception point (TRP), a baseband unit (BBU), and a remote radio unit. The micro base station is sometimes referred to as a small cell. The terminal may include but is not limited to a mobile phone, a tablet computer, a laptop computer, a wearable device (a smart watch, a smart band, a smart helmet, smart glasses, or the like), and other communications devices having a wireless access capability, such as various Internet of Things devices, including smart home devices (such as smart meters and smart appliances) and smart vehicles, and the like.

FIG. 1 is a schematic structural diagram of a wireless communications system according to an embodiment of the present invention. FIG. 1 shows one base station and one terminal that are respectively denoted as BS and T. An uplink and a downlink between the base station and the terminal are respectively denoted as UL and DL. It should be understood that, although only one base station and one terminal are shown in FIG. 1, the wireless communications system may alternatively include another quantity of base stations and terminals, and may further include another network device.

It should be understood that a technical solution provided in this application does not limit types of the wireless communications system. Using a mobile communications system as an example, the technical solution provided in this application not only may be applied to a 5G mobile communications system and an evolved system thereof, but also may be applied to a 4G long term evolution (LTE) system and an evolved system thereof.

In this embodiment of the present invention, the terminal and the base station in the wireless communications system support one or more types of radio access technologies (RAT), for example, an RAT in 5G and an evolved system thereof, and/or an RAT in 4G and an evolved system thereof. Specifically, both the terminal and the base station support an air interface parameter, a coding scheme, a modulation scheme, and the like of the RAT. The air interface parameter is a parameter used to describe an air interface characteristic. The air interface parameter is sometimes also referred to as numerology. The air interface parameter generally includes parameters such as a subcarrier spacing (SC) and a cyclic prefix (CP).

In addition, the terminal and the base station also know various types of predefined configurations of the wireless communications system. The predefined configurations of the system may be used as a part of a standard protocol of the wireless communications system, and may alternatively be determined through interaction between the terminal and the base station. Some content of the standard protocol of the wireless communications system may be pre-stored in a memory of the terminal and the base station, and/or represented as a hardware circuit or software code of the terminal and the base station.

For example, the wireless communications system may support a plurality of types of different air interface parameters. These air interface parameters may be used as a part of a standard protocol, and one or more types of actually used air interface parameters are determined through interaction between the terminal and the base station. Using a subcarrier spacing as an example, in this embodiment of the present invention, the subcarrier spacing supported by the wireless communications system not only may include a subcarrier spacing of 15 kHz in an LTE system, but also may include a larger (for example, 30 kHz or 60 kHz) or a smaller (for example, 7.5 kHz or 1.25 kHz) subcarrier spacing. In addition, the wireless communications system may simultaneously support a plurality of types of different subcarrier spacings.

Figure 2:
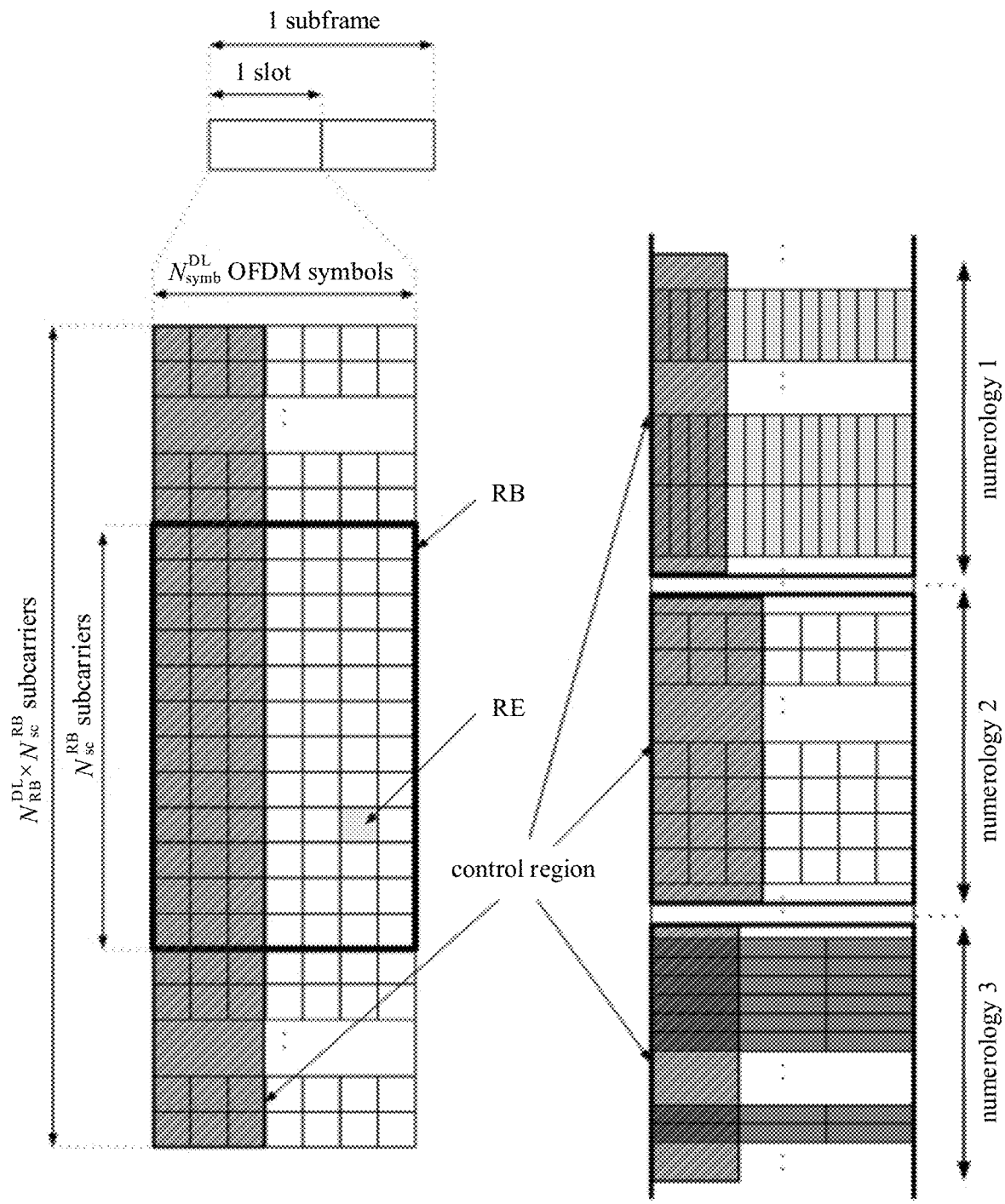
FIG. 2 is a schematic diagram of a radio resource according to an embodiment of the present invention.

FIG. 2 is a schematic diagram of a radio resource according to an embodiment of the present invention, and shows two schematic time-frequency resource grids supported by a wireless communications system. In a time-frequency resource grid shown in a left half part of FIG. 2, a same type of subcarrier spacing is included within a same time range. In a time-frequency resource grid shown in a right half part of FIG. 2, a plurality of types of different subcarrier spacings are included within a same time range. Although three types of subcarrier spacings are shown in the right half part of FIG. 2, subcarrier spacings simultaneously supported by the wireless communications system may not be limited to three types, and may be of two types or more than three types.

The time-frequency resource grid shown in the left half part of FIG. 2 may correspond to a downlink time-frequency resource grid in an LTE system. A time resource unit of the LTE system is an orthogonal frequency division multiplexing (OFDM) symbol (symb), and a frequency resource unit of the LTE system is a subcarrier (SC). A smallest grid unit in the time-frequency resource grid corresponds to one OFDM symbol and one subcarrier. In a related technical specification (TS) of the 3rd generation partnership project (3GPP), the smallest grid unit in the time-frequency resource grid is referred to as a resource element (RE).

As shown in the left half part of FIG. 2, in time domain, one downlink subframe includes two slots, and one slot includes $N_{symb}^{DL}$ OFDM symbols. In frequency domain, a downlink frequency resource includes $N_{RB}^{DL}$ resource blocks (RB). Each RB includes $N_{sc}^{RB}$ subcarriers. Referring to a related stipulation in the technical specification of the 3GPP, when the subcarrier spacing supported by the LTE system is 15 kHz, $6 \leq N_{RB}^{DL} \leq 110$, where $N_{symb}^{DL}$ is 7 (normal CP) or 6 (extended CP), and $N_{sc}^{RB}$ is 12.

In the LTE system, a downlink subframe is usually divided into a control region and a data region. The control region includes first several OFDM symbols of the subframe, and the data region includes a remaining OFDM symbol of the subframe. As shown in the left half of FIG. 2, in the time-frequency resource grid, first three OFDM symbols are in a control region, and remaining OFDM symbols of the subframes are in a data region. The control region of the downlink subframe is mainly used to transmit layer 1 or layer 2 (L1/L2) control signaling. The L1/L2 control signaling is not service data, but can be used to control transmission of the service data, and the service data is transmitted by using the data region.

In the control region, the LTE system further provides a concept of a resource element group (REG). The REG is a basic unit for allocating a time-frequency resource to downlink L1/L2 control signaling. One REG includes at least four REs that can be used for transmitting the downlink L1/L2 control signaling. The REG included in the control region of the downlink subframe may be used for transmitting a PCFICH, a PHICH, and a PDCCH. For details, refer to an existing technical specification of the 3GPP.

One PDCCH carries one piece of downlink control information (DCI) in a particular format. Because the base station may schedule a plurality of terminals simultaneously in uplink and downlink, a plurality of PDCCHs may exist simultaneously in one subframe. Each PDCCH is transmitted on n consecutive control channel elements (CCE), and each CCE includes nine REGs. A value range of n is {1, 2, 4, 8}, and is denoted as an aggregation level. A CCE index of the first CCE occupied by the PDCCH is referred to as $n_{CCE}$, and the index may be used to determine a starting position of blind detection of the DCI. The starting position of a common search space usually starts from the first CCE by default. A starting position of a UE-specific search space is different. In the LTE system, different aggregation levels may correspond to different UE-specific search spaces, and each UE-specific search space also has a respective starting position. In addition, for different terminals, starting positions of UE-specific search spaces may also be different. Specifically, a starting position of a UE-specific search space is related to a radio network temporary identifier (RNTI) and a subframe number of the terminal.

In this embodiment of the present invention, the wireless communications system is not limited to the LTE system. A time-frequency resource grid of a radio resource supported by the wireless communications system is not limited to a time-frequency resource grid of the LTE system either. For example, a length of a time resource unit may be not limited to one OFDM symbol, and may be less than one OFDM symbol, may be greater than one OFDM symbol, or may be a non-OFDM time domain symbol. A frequency resource unit may also be not limited to one subcarrier, and may be less than one subcarrier, may be greater than one subcarrier, or may be a non-subcarrier frequency unit. However, for ease of description and understanding, the following may describe the technical solutions provided in this application still by using related terms (for example, a control region, a subcarrier, and a subframe) of the LTE system as an example. It should be understood that, meanings of the terms of the LTE system used below may be extended, compared with those in the existing technical specification of the 3GPP.

The time-frequency resource grid shown in the right half part of FIG. 2 may correspond to another time-frequency resource grid in this embodiment of the present invention. Different from that in the LTE system, in the time-frequency resource grid shown in the right half part of FIG. 2, the wireless communications system may simultaneously support three types of different air interface parameters (where the subcarrier spacing is used as an example in the figure). An air interface parameter in an uppermost part of the right side in FIG. 2 is denoted as numerology 1, an air interface parameter in a middle part of the right side in FIG. 2 is denoted as numerology 2, and an air interface parameter in a lowermost part of the right side in FIG. 2 is denoted as numerology 3. Without loss of generality, an air interface parameter of the LTE system may be used as the numerology 2.

As shown in the right half part of FIG. 2, a subcarrier spacing of the numerology 1 is greater than a subcarrier spacing of the numerology 2, and the subcarrier spacing of the numerology 2 is greater than a subcarrier spacing of the numerology 3. Correspondingly, duration of a time domain symbol of the numerology 1 is less than that of the numerology 2, and the duration of the time domain symbol of the numerology 2 is less than that of the numerology 3. The time domain symbol may be an OFDM symbol, or may be another time resource unit. In addition, in the time-frequency resource grid shown in the right half part of FIG. 2, one control region is separately shown for each of three types of different air interface parameters. These control regions separately occupy some time domain symbols, and may be used to transmit L1/L2 control signaling. Quantities of time domain symbols included in control regions corresponding to different air interface parameters are also different. It should be understood that, control regions corresponding to the three air interface parameters each include first several time domain symbols. However, the wireless communications system in this embodiment of the present invention may also support other air interface parameters. Control regions corresponding to these other air interface parameters are not limited to first several time domain symbols; and for some air interface parameters, there is even no control region in some subframes.

Based on the wireless communications system shown in FIG. 1 and FIG. 2, the terminal and the base station may exchange service data and control signaling by using an air interface. Service data transmission may be classified into uplink data transmission or downlink data transmission. It should be understood that, in this embodiment of the present invention, the uplink data transmission and the downlink data transmission may respectively correspond to a physical uplink shared channel (PUSCH) and a physical downlink shared channel (PDSCH) in 4G and the evolved system thereof, and an uplink physical layer data channel similar to the PUSCH and a downlink physical layer data channel similar to the PDSCH in 5G and the evolved system thereof.

Configuration information of the downlink data transmission or the uplink data transmission usually needs to be indicated by the base station to the terminal by using control signaling, so that the terminal can receive the corresponding downlink data transmission or send the corresponding uplink data transmission according to the indication of the base station. In the LTE system, the base station indicates, to the terminal by using DCI, the configuration information of the downlink data transmission and the configuration information of the uplink data transmission. The DCI is mainly used to carry L1/L2 control signaling. In the wireless communications system in this embodiment of the present invention, the base station may indicate, to the terminal by using a downlink control message, configuration information of downlink data transmission and configuration information of uplink data transmission. The downlink control message may correspond to DCI in 4G and the evolved system thereof, or a control plane message, in 5G and the evolved system thereof, that can be used to carry L1/L2 control signaling.

In this embodiment of the present invention, the downlink control message may have a plurality of predefined formats. These predefined formats include some given information fields. An information field may be understood as a given field of the downlink control message, and a value range of the field and a meaning of each value may be predefined by the system. It should be understood that the predefined formats of the downlink control message may be similar to a DCI format already defined for the LTE system in terms of forms, but need to be redefined in terms of content. These newly defined formats are different from an existing DCI format and can be used as a part of a standard protocol of the wireless communications system.

Particularly, different from existing DCI in the LTE system, in this embodiment of the present invention, a downlink control message in at least one particular format of these predefined formats can be used to carry service data to be transmitted to the terminal. For example, at least one information field in the downlink control message in the particular format is used to carry service data. On this basis, if the downlink control message in at least one of the foregoing formats further includes other information fields, these other information fields may still be used to carry L1/L2 control signaling. In addition, different from the downlink control message, in the particular format, that can be used to carry the service data, a downlink control message in another predefined format still cannot be used to carry the service data. It should be understood that, if no ambiguity is caused, downlink control messages in this application are usually downlink control messages, in a particular format, that can be used to carry service data.

It should be understood that these downlink control messages in the predefined format may all be transmitted in a control region of a downlink subframe. For ease of description, in this application, a resource occupied by the control region is simply denoted as a control region resource. The control region resource may correspond to a control region (corresponding to one type of air interface parameter) in the time-frequency resource grid shown in the left half part of FIG. 2, or may correspond to a control region (corresponding to a plurality of types of air interface parameters) in the time-frequency resource grid shown in the right half part of FIG. 2. Because the control region resource may be shared by a plurality of downlink control messages, and the downlink control messages have a plurality of possible formats, a format of a downlink control message and a radio resource actually occupied by the downlink control message may be unknown to the terminal. Therefore, if the terminal expects to receive the downlink control message, the terminal may need to receive, on the control region resource, the downlink control message by blind detection. The blind detection sometimes is also referred to as blind decoding.

Figure 3:
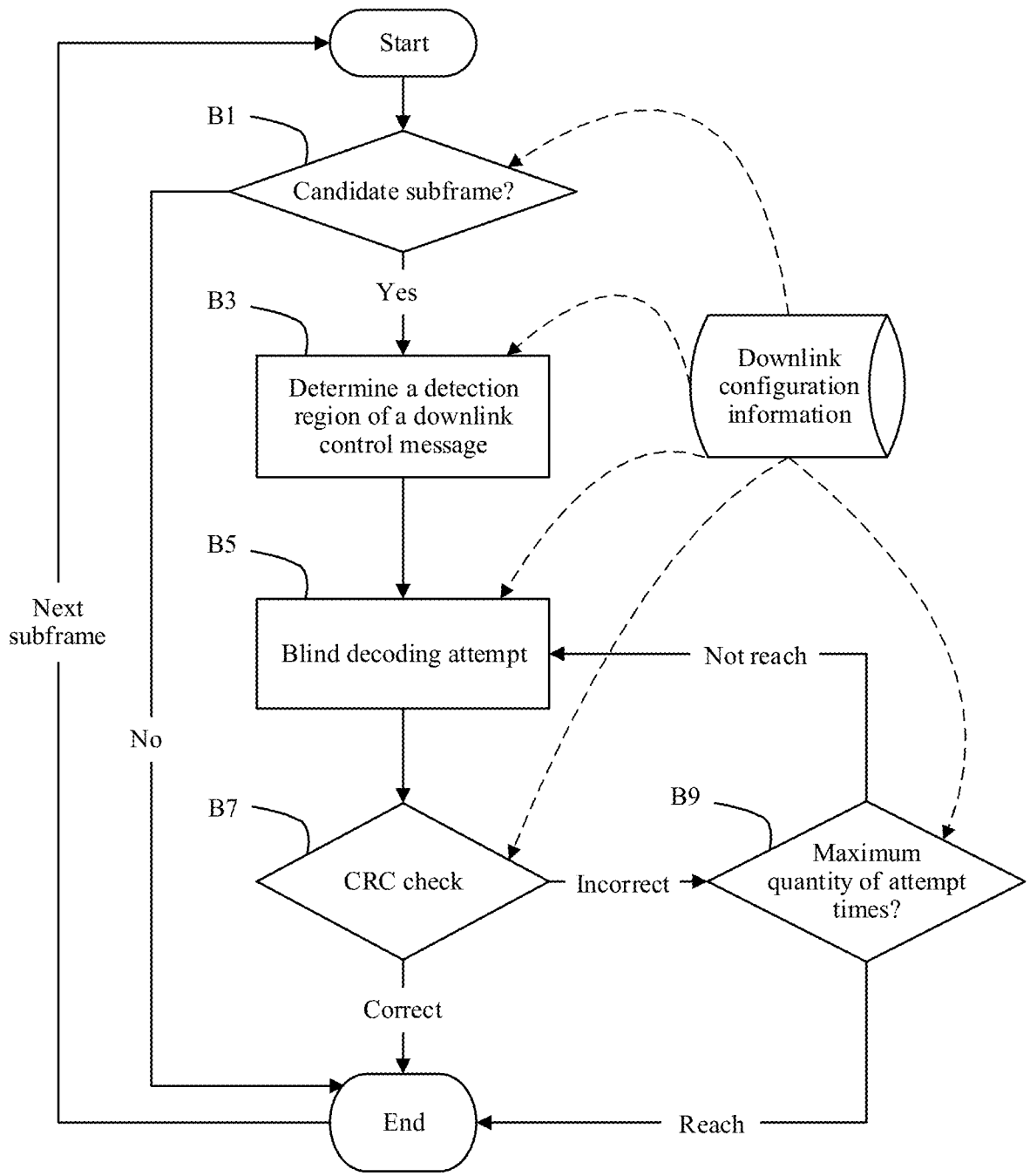
FIG. 3 is a schematic flowchart of blind detection of a downlink control message according to an embodiment of the present invention.

FIG. 3 is a schematic flowchart of blind detection of a downlink control message according to an embodiment of the present invention. It should be understood that the schematic flowchart shown in FIG. 3 is merely an example in which a terminal performs, on a control region resource of a downlink subframe, the blind detection of the downlink control message. The scope of this embodiment of the present invention is not limited thereto. A procedure of the blind detection of the downlink control message shown in FIG. 3 may be performed by the terminal in the wireless communications system shown in FIG. 1 and FIG. 2.

As shown by a module B1 in FIG. 3, the terminal first determines whether a subframe is a candidate subframe.

It should be understood that one or more candidate subframes may be allocated to one terminal. Different candidate subframes may be allocated to different terminals. The candidate subframes are usually some of all subframes supported by the system; in these subframes, there may be a downlink control message sent to the terminal. Therefore, the terminal may blindly detect, only in candidate subframes of the terminal, whether there is a downlink control message sent to the terminal, and does not need to consider a non-candidate subframe, thereby reducing blind detection overheads. If the terminal does not determine the candidate subframes of the terminal, the terminal may have to perform, for all subframes supported by the terminal, the blind detection of the downlink control message.

If a determining result is "no", the blind detection procedure of the terminal for the subframes ends. After the blind detection procedure for the subframes ends, the terminal may further restart a blind detection procedure for a next subframe.

If a determining result is "yes", the terminal determines, in the subframes, a detection region of the downlink control message. Refer to a module B3 in FIG. 3.

It should be understood that the detection region of the downlink control message may be a subset of control region resources. For example, the detection region of the downlink control message may correspond to a search space of the LTE system, including a common search space and a UE-specific search space. The search space is a set of PDCCH candidates. Each PDCCH candidate may carry one piece of DCI. The terminal may attempt to decode information carried in a PDCCH candidate, and verify, based on a CRC check, whether information obtained through the decoding is DCI transmitted to the terminal. Because the set of PDCCH candidates does not include REGs occupied by a PCFICH and a PHICH, the search space is also a subset of control region resources. In this embodiment of the present invention, the detection region of the downlink control message may be a common search space, or may be a UE-specific search space.

As shown in FIG. 2, different air interface parameters may correspond to different control region resources. Therefore, when the system supports a plurality of air interface parameters, the terminal may need to determine control region resources based on the air interface parameters, and further determine the detection region of the downlink control message. One or more candidate air interface parameters may be allocated to one terminal. Different candidate air interface parameters may be allocated to different terminals. The candidate air interface parameters are usually some of all air interface parameters supported by the system, and the downlink control message sent to the terminal may exist on control region resources corresponding to these air interface parameters. Therefore, the terminal may determine, only on the control region resources corresponding to the candidate air interface parameters of the terminal, the detection region of the downlink control message, and does not need to consider the non-candidate air interface parameter, thereby reducing the blind detection overheads. If the terminal does not determine the candidate air interface parameters of the terminal, the terminal may have to determine, all air interface parameters supported by the terminal, the detection region of the downlink control message.

It should be understood that there may be a plurality of possibilities for a starting position of the detection region of the downlink control message. For example, the detection region of the downlink control message may correspond to a UE-specific search space, or a plurality of common search spaces introduced by different air interface parameters, or a combination of a UE-specific search space and a common search space. The common search space and the UE-specific search space have different starting positions. Therefore, the terminal may further need to determine a starting position of the detection region of the downlink control message. The starting position may be determined by a starting index (for example, a CCE index). One or more candidate starting indexes may be allocated to one terminal. Different candidate starting indexes may be allocated to different terminals. The candidate starting indexes are used to determine the starting position of the detection region of the downlink control message, to further reduce the blind detection overheads.

As shown in FIG. 3, after determining the detection region of the downlink control message, the terminal attempts to blindly decode the downlink control message. Refer to a module B5 in FIG. 3. In addition, the terminal may record a quantity of blind decoding attempts. For example, the terminal may set a counter, and the counter is incremented by one each time one blind decoding attempt is performed.

It should be understood that, in a process of the blind decoding of the downlink control message, the terminal usually needs to use a size or a payload of the downlink control message. Downlink control messages in different formats may have different sizes or payloads. If the terminal expects to receive a downlink control message in a particular format, the terminal may determine, based on the particular format, a size or a payload of the downlink control message that needs to be blindly decoded. One or more candidate formats of a downlink control message may be allocated to one terminal. Different candidate formats of a downlink control message may be allocated to different terminals. Therefore, the terminal may attempt to blindly decode only a downlink control message in a candidate format, and does not need to attempt to blindly decode a downlink control message in a non-candidate format, thereby reducing the blind detection overheads.

As shown in FIG. 3, after the blind decoding attempt, the terminal further needs to check a decoding result, to verify whether the decoding is correct. Refer to a module B7 in FIG. 3.

It should be understood that the downlink control message usually includes redundancy check information, and the redundancy check information may be used to check the decoding result of the downlink control message. As shown in the module B7, a possible redundancy check manner is a cyclic redundancy check (CRC). Specifically, a base station may generate, based on a check identifier, a downlink control message including the redundancy check information. Because the check identifier used by the base station may be unknown to the terminal, the terminal may use candidate check identifiers to check the decoding result of the downlink control message. The candidate check identifiers are usually some of all check identifiers supported by the system, and these check identifiers may be used to check the downlink control message sent to the terminal. One or more candidate check identifiers may be allocated to one terminal. Different candidate check identifiers may be allocated to different terminals. Therefore, the terminal may use only the candidate check identifiers, and does not need to use a non-candidate check identifier, thereby reducing the blind detection overheads.

If the CRC check succeeds, it indicates that the decoding is "Correct". The terminal may consider this blind decoding attempt successful, and therefore considers that the downlink control message has been successfully received and ends this blind detection procedure.

If the CRC check fails, it indicates that the decoding is "Incorrect". The terminal may consider this blind decoding attempt unsuccessful. Then, the terminal may determine whether a current quantity of blind decoding attempt times reaches a maximum quantity of attempt times. Refer to a module B9 in FIG. 3.

If a determining result is "Reach", the terminal ends this blind detection procedure. If a determining result is "Not reach", the terminal continues to perform a blind decoding attempt, until the blind decoding attempt succeeds, or the quantity of blind decoding attempt times reaches the maximum quantity of attempt times.

It should be understood that one or more of the candidate subframes, the candidate air interface parameters, the candidate starting indexes, the candidate check identifiers, the candidate formats of the downlink control message, and the maximum quantity of attempt times that are allocated to the terminal may be directly or indirectly indicated by the base station by using downlink configuration information received from the base station. For specific content, refer to optional Embodiment 2 to Embodiment 7 in the following.

Figure 4:
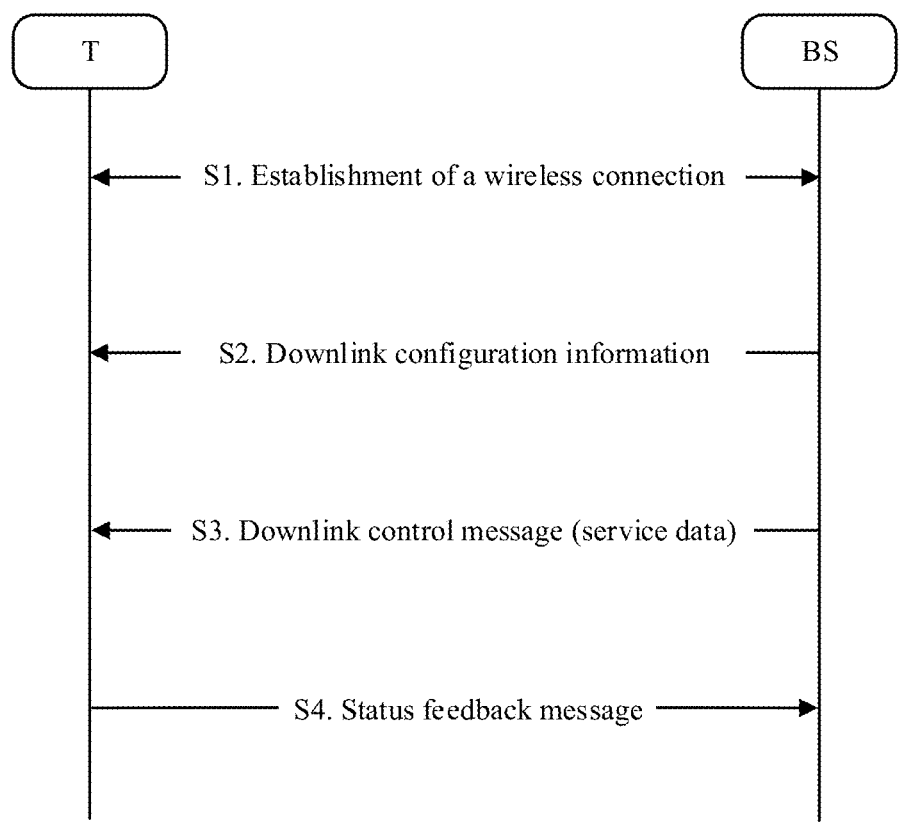
FIG. 4 is a schematic flowchart of a wireless communication method according to an embodiment of the present invention.

FIG. 4 is a schematic flowchart of a wireless communication method according to an embodiment of the present invention. A direction of a horizontal line between a base station (denoted as BS) and a terminal (denoted as T) indicates a transmission direction, and a text on the horizontal line indicates a schematic name of transmitted information or a transmitted signal. As shown in FIG. 4, the wireless communication method may include the following operations.

Operation S1. Establish a wireless connection between the terminal and the base station.

Because establishment of the wireless connection may require two-way information exchange between the terminal and the base station, a double-headed arrow is shown for operation S1 in FIG. 4. It should be understood that a type of the wireless connection does not need to be limited in this embodiment of the present invention. For example, the wireless connection may include a data radio bearer (DRB) and a signaling radio bearer (SRB). After the wireless connection is established, the terminal and the base station can exchange service data and control signaling by using an air interface. For example, the base station sends downlink configuration information to the terminal in operation S2, the base station sends a downlink control message to the terminal in operation S3, and the terminal sends a status feedback message to the base station in operation S4.

Operation S2. The base station sends the downlink configuration information to the terminal; and correspondingly, the terminal receives the downlink configuration information from the base station.

Operation S2 is downlink transmission, and a one-way arrow from the base station to the terminal is used for operation S2 in FIG. 4. The downlink configuration information is used to indicate a configuration of the downlink control message, the configuration of the downlink control message includes a format of the downlink control message, and the downlink control message is used to carry service data to be transmitted to the terminal.

It should be understood that there may be a plurality of types of downlink control messages that can be used to carry the service data to be transmitted to the terminal. Downlink control messages in different formats may correspond to different format indexes. To reduce transmission overheads, the downlink configuration information may indirectly indicate the format of the downlink control message by indicating a format index. In addition to the format of the downlink control message, other content may be further included in the configuration of the downlink control message indicated by the downlink configuration information. For details, refer to descriptions of optional implementations/embodiments in the following.

Then, the base station and the terminal may respectively send and receive the downlink control message based on the configuration of the downlink control message indicated by the downlink configuration information. For details, refer to operation S3.

Operation S3. The base station sends the downlink control message to the terminal; and correspondingly, the terminal receives the downlink control message from the base station.

Operation S3 is also downlink transmission, and a one-way arrow from the base station to the terminal is also used for operation S3 in FIG. 4. As mentioned in operation S2, the downlink control message is used to carry the service data to be transmitted to the terminal. Therefore, after receiving the downlink control message, the terminal can obtain the service data carried in the downlink control message. For receiving, by the terminal, the downlink control message from the base station, refer to the blind detection procedure shown in FIG. 3.

Operation S4. The terminal sends the status feedback message to the base station; and correspondingly, the base station receives the status feedback message from the terminal.

Operation S4 is uplink transmission, and a one-way arrow from the terminal to the base station is used for operation S4 in FIG. 4. The status feedback message is used to feed back, to the base station, whether the service data carried in the downlink control message is correctly received. It should be understood that operation S4 in this embodiment of the present invention is an optional operation, to be specific, the terminal does not necessarily need to send the status feedback message to the base station.

In an existing LTE system, service data is carried by using a PDSCH, and scheduling information of the PDSCH is carried in DCI. To obtain the service data, the terminal needs to complete at least two operations. The terminal first receives the DCI and then receives the PDSCH scheduled based on the DCI. If either of the DCI and the PDSCH fails to be received, the terminal cannot obtain the correct service data. In addition, the at least two operations also increase a transmission delay of the service data.

Compared with the prior art, in this embodiment of the present invention, the downlink control message is used to carry the service data to be transmitted to the terminal. After receiving the downlink control message, the terminal can obtain the service data carried in the downlink control message. Therefore, the technical solution in this embodiment of the present invention helps improve service reliability and reduce a service latency.

In one embodiment, for the downlink control message and the format of the downlink control message in this embodiment of the present invention, refer to the DCI and a format of the DCI in the LTE system. However, even if the DCI format in the LTE system is used for reference, the format of the downlink control message in this embodiment of the present invention is still improved. Definitions of some information fields in the downlink control message and a size of the message may be all different from those of the DCI in the LTE system. It should be understood that an information field in the DCI in the LTE system is mainly used to carry L1/L2 control signaling. Although the L1/L2 control signaling may assist in transmission of the service data, the control signaling is not the service data. At least one information field in the downlink control message in this embodiment of the present invention is used to carry the service data, and another information field in the downlink control message may be used to carry the L1/L2 control signaling.

For example, in the LTE system, some information fields in the DCI are used to indicate a resource and a modulation and coding scheme for the transmission of the service data, but cannot be used to transmit the service data. However, in the embodiment, these information fields in the DCI in the LTE system may be redefined, used to carry the service data, and no longer used to indicate the resource and the modulation and coding scheme for the transmission of the service data. An original definition may still be used for another information field in the DCI. Therefore, a format of the downlink control message, different from an existing DCI format, in this embodiment of the present invention may be obtained.

In another embodiment, the downlink control message in this embodiment of the present invention may alternatively be independent of the DCI format in the LTE system. For example, an information field in the downlink control message does not need to use a definition of an information field in the LTE system, and the downlink control message has a message size independent of the DCI in the LTE system. Particularly, at least one information field in the downlink control message is used to carry the service data. In addition, a function of the another information field in the downlink control message is not limited in this embodiment of the present invention, and the another information field in the downlink control message may also be used to carry the L1/L2 control signaling.

In one embodiment, the control signaling carried in the another information field in the downlink control message includes an identifier of a data radio bearer.

It should be understood that there may be more than one data radio bearer between the terminal and the base station. To distinguish between these data radio bearers, each data radio bearer has a unique identifier. Each identifier may uniquely identify one data radio bearer. For the terminal and the base station, if only one data radio bearer can use a downlink control message to carry service data, the service data carried in the downlink control message may belong to the data radio bearer by default. If a plurality of data radio bearers between the terminal and the base station can use a downlink control message to carry service data, there are a plurality of possibilities for a data radio bearer to which the service data carried in the downlink control message belongs.

To determine the data radio bearer to which the service data carried in the downlink control message belongs, the terminal may sequentially test these data radio bearers, and determine the data radio bearer in a post-event verification manner. However, this manner causes an increase in computational overheads and an increase in the service latency. In the embodiment, the identifier of the data radio bearer is indicated by using the downlink control message. After receiving the downlink control message, the terminal not only can obtain the service data carried in the downlink control message, but also can further determine, based on the identifier of the data radio bearer carried in the downlink control message, that the service data belongs to the data radio bearer. Therefore, the embodiment helps further reduce the computational overheads and reduce the service latency.

In another embodiment, the configuration, of the downlink control message, indicated by the downlink configuration information further includes the identifier of the data radio bearer.

It should be understood that there may be a plurality of data radio bearers between the terminal and the base station. In addition, not all of the plurality of data radio bearers require the service data to be carried in the downlink control message. In the embodiment, the downlink configuration information may indicate only those data radio bearers that require the service data to be carried in the downlink control message. Therefore, when receiving the downlink control message, the terminal may focus only on the data radio bearers indicated by the downlink configuration information, and does not need to focus on other data radio bearers that are not needed.

For example, if there is only one data radio bearer identifier indicated by the downlink configuration information, the service data carried in the downlink control message may belong to, by default, a data radio bearer identified by the identifier. Even if there are a plurality of data radio bearer identifiers indicated by the downlink configuration information, the embodiment reduces a range of candidate data radio bearers. The terminal may still determine, in this smaller range by using another method, the data radio bearer to which the service data carried in the downlink control message belongs. Therefore, the embodiment helps further reduce the computational overheads and reduce the service latency.

In one embodiment, there is a correspondence between the downlink control message format indicated by the downlink configuration information and the data radio bearer identifier indicated by the downlink configuration information. In this way, the terminal may determine, based on an actually received format of the downlink control message, the data radio bearer to which the service data carried in the downlink control message belongs. Therefore, the embodiment also helps further reduce the computational overheads and reduce the service latency.

To describe technical solutions in embodiments of the present invention in more detail, this application further provides the following optional Embodiment 1 to Embodiment 7. Embodiment 1 mainly describes some possible formats of the downlink control message in the embodiments of the present invention. Embodiment 2 to Embodiment 6 mainly describe some possible content indicated by the downlink configuration information in the embodiments of the present invention. As described above, in addition to the format of the downlink control message, other content may be further included in the configuration, of the downlink control message, indicated by the downlink configuration information. The other content is described by using examples in the following Embodiment 2 to Embodiment 6.

It should be understood that downlink configuration information indicating the format of the downlink control message and downlink configuration information indicating the other content in the following Embodiment 2 to Embodiment 6 may be carried in a same configuration message or may be carried in different configuration messages. These configuration messages may be system messages, radio resource control (RRC) messages, or other possible configuration messages. In addition, content in the following optional embodiments, such as a specific form of a table or a formula, and a value of a specific parameter in the table or the formula, is mainly used to schematically describe some embodiments of the present invention. Apparently, the scope of the embodiments of the present invention is not limited thereto.

Embodiment 1

In this embodiment, some possible formats of a downlink control message in this embodiment of the present invention are described by using examples.

As described above, for a format of the downlink control message in this embodiment of the present invention, refer to a DCI format in an LTE system. In the existing LTE system, there are a plurality of DCI formats, and DCI in different formats has different functions. For example, a DCI format 0 and a DCI format 4 are used for scheduling of uplink data transmission (PUSCH), and a DCI format 1 and a DCI format 2 are used for scheduling of downlink data transmission (PDSCH). For a detailed format of the DCI in the LTE system, including an information field and a size and a meaning of the information field, refer to a related technical specification of the 3GPP, for example, a description about the DCI in section 5.3.3 of 36.212 V10.3.0 (2011-09).

A DCI format 1 in an LTE system release 10 is used as an example. The DCI format 1 includes a plurality of predefined information fields. For names of these information fields, refer to a left half part of Table 1. For sizes and meanings of these information fields, refer to explanations in a right half part of Table 1.

TABLE 1

DCI format 1 in LTE

| DCI format 1 (release 10) | Remarks |
| --- | --- |
| Carrier indicator | Zero or three bits, and used to indicate a resource, of a serving cell, scheduled based on the DCI. |
| Resource allocation header (resource allocation type 0/type 1) | One bit, and used to indicate a resource allocation type. A value 0 of the field indicates a type 0, and a value 1 indicates a type 1. |
| Resource block assignment | Used to indicate resource block allocation: For a resource allocation type 0 and a resource allocation type 1, a bit included in the field has different meanings. |
| Modulation and coding scheme | Five bits, and used to indicate a modulation and coding scheme. |
| HARQ process number | Three bits (FDD) or four bits (TDD), and used to indicate a process number of a hybrid automatic repeat request. |
| New data indicator | One bit, and used to indicate whether current transmission is new transmission or retransmission. |
| Redundancy version | Two bits, and used to indicate a redundancy version of current transmission. |
| TPC command for PUCCH | Two bits, and used to indicate power control of the PUCCH. |
| Downlink Assignment Index | Two bits, and used to indicate a quantity of subframes, in an HARQ feedback window, that include downlink transmission. |

For a possible format of the downlink control message in this embodiment of the present invention, refer to the DCI format in LTE. For example, a meaning of an information field in the DCI format 1 or another DCI format is redefined and used to transmit service data.

The following Table 2 to Table 5 schematically provide some other possible formats of the downlink control message in this embodiment of the present invention. Downlink control messages in these formats each include a Small packet field, and the field is used to carry service data to be sent to a terminal. It should be understood that the possible formats of the downlink control message are merely examples, and a name, a definition, and a size of an information field are merely for reference. The format of the downlink control message in this embodiment of the present invention is not limited thereto.

TABLE 2

Schematic format of the downlink control message

| Format of the downlink control message | Remarks |
| --- | --- |
| Small packet | x bits, and used to carry service data to be sent to a terminal. |

TABLE 2-continued

Schematic format of the downlink control message

| Format of the downlink control message | Remarks |
| --- | --- |
| HARQ process number | Three bits or four bits, and used to indicate a process number of a hybrid automatic repeat request. |
| New data indicator | One bit, and used to indicate whether current transmission is new transmission or retransmission. |
| Others | . . . |

TABLE 3

Another schematic format of the downlink control message

| Format of the downlink control message | Remarks |
| --- | --- |
| Small packet | y bits, and used to carry service data to be sent to a terminal. |
| Others | . . . |

TABLE 4

Another schematic format of the downlink control message

| Format of the downlink control message | Remarks |
| --- | --- |
| Small packet | z bits, and used to carry service data to be sent to a terminal. |
| DRB ID | Three bits, and used to indicate an identifier of a data radio bearer. |
| Others | . . . |

TABLE 5

Another schematic format of the downlink control message

| Format of the downlink control message | Remarks |
| --- | --- |
| Small packet | z bits, and used to carry service data to be sent to a terminal. |
| DRB ID | Five bits, and used to indicate an identifier of a data radio bearer. |
| New data indicator | One bit, and used to indicate whether current transmission is new transmission or retransmission. |
| Others | . . . |

In the formats of the downlink control message shown in Table 2 and Table 5, some information fields of the existing DCI format are used. For example, an HARQ process number field and a New data indicator field of the existing DCI format are used in Table 2, and the New data indicator field is used in Table 5. In the formats of the downlink control message shown in Table 3 and Table 4, an information field of the existing DCI format may not be used. In addition, some information fields used to carry L1/L2 control signaling may be redefined. As shown in Table 4 and Table 5, the DRB ID field is used to indicate the identifier of the data radio bearer. It is clear that the information field is not an information field of the existing DCI format. It should be understood that a size of the DRB ID field is not unique, and may be three bits in Table 4 or five bits in Table 5, or may be another possible quantity of bits (for example, two bits or one bit).

In the formats of the downlink control message shown in Table 2 to Table 5, a size of the Small packet field is not unique either, and is respectively represented by using x, y, and z bits in Table 2 to Table 5. Usually, an amount of information that can be carried by the Small packet field is not especially large, for example, several bits, tens of bits, or hundreds of bits. In the formats of the downlink control message shown in Table 2 to Table 5, the Others field indicates that the downlink control message in the formats may further include other information fields. Value ranges and meanings of these information fields are also predefined by a system.

Embodiment 2

In this embodiment, a configuration, of a downlink control message, indicated by the downlink configuration information further includes: an identifier of a data radio bearer and a candidate subframe corresponding to the data radio bearer. The candidate subframe is used to transmit the downlink control message, and service data carried in the downlink control message belongs to the data radio bearer.

It should be understood that there may be one or more data radio bearer identifiers indicated by the downlink configuration information, and each data radio bearer may correspond to one or more candidate subframes. On one hand, the downlink configuration information is used to indicate the identifier of the data radio bearer, so that a range of the candidate data radio bearers can be reduced. On the other hand, the downlink configuration information is used to indicate the data radio bearer and the candidate subframe corresponding to the data radio bearer, so that a terminal excludes a non-candidate subframe before receiving the downlink control message. For example, assuming that different data radio bearers correspond to different candidate subframes, the terminal may determine, based on a subframe in which a received downlink control message is located, a data radio bearer to which service data carried in the downlink control message belongs. From a perspective of the two aspects, a solution of the optional embodiment helps further reduce computational overheads and reduce a service latency.

Table 6 schematically provides a type of possible content indicated by the downlink configuration information in this embodiment of the present invention. As shown in Table 6, a type of possible content indicated by the downlink configuration information includes: a format index (a format index 5) of one downlink control message, identifiers (a DRB 1, a DRB 3, and a DRB 5) of three data radio bearers, and five candidate subframes. A candidate subframe corresponding to the DRB 1 is a subframe 1, candidate subframes corresponding to the DRB 3 are subframes 4 and 5, and a candidate subframe corresponding to the DRB 5 is a subframe 9. It should be understood that the format index, the DRB identifiers, the quantity of subframes, and the numbers of the subframes in Table 6 are merely for reference, and the scope of this embodiment of the present invention is apparently not limited thereto.

TABLE 6

Schematic content indicated by the downlink configuration information
Content of the downlink configuration information
Format index 5

| | |
|---|---|
| DRB 1 | Subframe 1 |
| DRB 3 | Subframe 4 and the subframe 5 |
| DRB 5 | Subframe 9 |

Based on the content schematically shown in Table 6, it is assumed that there are six data radio bearers established between the terminal and a base station, and predefined formats of the downlink control message supported by the system include a format 1 to a format 8. The format index 5 corresponds to the format 5 of the downlink control message. After receiving the downlink configuration information, the terminal learns that the base station may add, to a downlink control message in the format 5, service data to be transmitted to the terminal. In addition, the terminal further learns that the service data may belong to the DRB 1, the DRB 3, or the DRB 5, and the candidate subframes respectively corresponding to these DRBs. Subsequently, if the terminal expects to obtain the service data, the terminal may attempt to receive, in these candidate subframes, the downlink control message corresponding to the format index, and does not need to attempt to receive, in another subframe, a downlink control message in another format. For example, the terminal may attempt to receive, on control region resources in only the subframes 1, 4, 5, and 9, the downlink control message in the format 5, and does not need to attempt to receive, in other subframes (for example, subframes 2 and 3), a downlink control message in another format (for example, the format 4). Assuming that the terminal receives the downlink control message in the format 5 in the subframe 4, the terminal not only can obtain service data carried in the downlink control message, but also can further determine, based on the subframe 4 and a correspondence between the DRB 3 and the subframe 4, that the service data belongs to the DRB 3.

It should be understood that a correspondence between a radio data bearer and a candidate subframe may be independently indicated by using the downlink configuration information, as schematically shown in Table 6. The correspondence between the radio data bearer and the candidate subframe may alternatively be indicated jointly by using the downlink configuration information and other predefined configurations. The predefined configurations may be agreed upon in a protocol, and represented as a formula, a table, or another possible form in the protocol.

Table 7 schematically provides another type of possible content indicated by the downlink configuration information in this embodiment of the present invention. As shown in Table 7, a type of possible content indicated by the downlink configuration information includes: identifiers (a DRB 2 and the DRB 3) of two data radio bearers, and a period and an offset of a candidate subframe. With reference to Table 7, a possible predefined formula is in the following form:

$$(\text{FrameID}*N_F^{SF}+\text{SubFrameID})\bmod \text{period}=\text{offset}$$

FrameID represents a radio frame number, $N_F^{SF}$ represents a total quantity of subframes in a radio frame, SubFrameID represents a subframe number, period represents a period value, and offset represents an offset value. Therefore, a candidate subframe corresponding to a DRB can be determined by jointly using the foregoing predefined formula, and a period and an offset that are indicated in the downlink configuration information.

TABLE 7

Schematic content indicated by the downlink configuration information
Content of the downlink configuration information

| Identifier of a data radio bearer | Period of a candidate subframe | Offset of the candidate subframe |
|---|---|---|
| DRB 2 | 30 | 5 |
| DRB 3 | 20 | 2 |
| ... | | |

Based on the content schematically shown in Table 7 and the foregoing predefined formula, it is assumed that a length of a radio frame is 10 milliseconds, a length of each subframe is 1 millisecond, $N_F^{SF}=10$, and subframe numbers in each radio frame are 0 to 9. Then, a period of a candidate subframe corresponding to the DRB 2 is 30 milliseconds, and the candidate subframe is the sixth subframe (whose subframe number is 5) of the first radio frame in three consecutive radio frames; the period of the candidate subframe corresponding to the DRB 2 is 20 milliseconds, and the candidate subframe is the third subframe (whose subframe number is 2) of the first radio frame in two consecutive radio frames.

Subsequently, if the terminal expects to obtain the service data, the terminal may attempt to receive, only in these candidate subframes, the downlink control message, and does not need to attempt to receive, in another subframe, the downlink control message.

Embodiment 3

In this embodiment, a configuration, of a downlink control message, indicated by the downlink configuration information further includes: an identifier of a data radio bearer and a candidate check identifier corresponding to the data radio bearer. The candidate check identifier is used to check the downlink control message, and service data carried in the downlink control message belongs to the data radio bearer.

It should be understood that the downlink control message includes redundancy check information, and the redundancy check information may be used to check the received downlink control message, so that a terminal verifies whether the received downlink control message is a correct downlink control message. A base station may generate, based on the candidate check identifier, the downlink control message including the redundancy check information, and the terminal may verify the received downlink control message based on the candidate check identifier. A feasible redundancy check manner is a cyclic redundancy check (CRC), and the candidate check identifier is used to calculate a CRC code.

In one embodiment, the candidate check identifier may be a radio network temporary identifier (radio network temporary identifier, RNTI). For example, the candidate check identifier may be an existing cell RNTI (C-RNTI), another newly defined RNTI, or another possible check identifier.

Table 8 schematically provides a type of possible content indicated by the downlink configuration information in this embodiment of the present invention. As shown in Table 8, a type of possible content indicated by the downlink configuration information includes: a format index (a format index 2) of one downlink control message, identifiers (a DRB 1, a DRB 2, and a DRB 4) of three data radio bearers, and four candidate check identifiers. Candidate check identifiers corresponding to the DRB 1 are a check Identifier 1 and a check identifier 2, a candidate check identifier corresponding to the DRB 2 is a check identifier 5, and a candidate check identifier corresponding to the DRB 4 is a check identifier 6. It should be understood that the format index, the DRB identifiers, a quantity of check identifiers, and the numbers of the check identifiers in Table 8 are merely for reference, and the scope of this embodiment of the present invention is apparently not limited thereto.

TABLE 8

Schematic content indicated by the downlink configuration information
Content of the downlink configuration information
Format index 2

| DRB 1 | Check identifier 1, check identifier 2 |
|---|---|
| DRB 2 | Check identifier 5 |
| DRB 4 | Check identifier 6 |
| ... | |

Based on the content schematically shown in Table 8, after receiving the downlink configuration information, the terminal learns that the base station may add, to a downlink control message in the format 2, service data to be transmitted to the terminal. In addition, the terminal further learns that the service data may belong to the DRB 1, the DRB 2, or the DRB 4, and the candidate check identifiers respectively corresponding to these DRBs. Subsequently, if the terminal expects to obtain the service data, the terminal may use these candidate check identifiers to check whether the received downlink control message is a correct downlink control message. For example, the terminal may use only the check identifiers 1, 2, 5, and 6, and does not need to use other check identifiers (for example, check identifiers 3 and 4). Assuming that the terminal verifies, by using the check identifier 5, that the received downlink control message is a correct downlink control message, the terminal not only can obtain the service data carried in the downlink control message, but also can further determine, based on the check identifier 5 and a correspondence between the DRB 2 and the check identifier 5, that the service data belongs to the DRB 2. Therefore, a solution of the optional embodiment also helps further reduce computational overheads and reduce a service latency.

Embodiment 4

In this embodiment, a configuration, of a downlink control message, indicated by the downlink configuration information further includes: an identifier of a data radio bearer and a candidate air interface parameter corresponding to the data radio bearer. The candidate air interface parameter is used to determine a detection region of the downlink control message, and service data carried in the downlink control message belongs to the data radio bearer.

It should be understood that control regions corresponding to different air interface parameters are also different. Using a subcarrier spacing as an example, control region resource division is then affected, and the detection region of the downlink control message is also affected.

Table 9 schematically provides a type of possible content indicated by the downlink configuration information in this embodiment of the present invention. As shown in Table 9, a type of possible content indicated by the downlink configuration information includes: a format index (a format index 3) of one downlink control message, identifiers (a DRB 1 and a DRB 3) of two data radio bearers, and three candidate air interface parameters. A candidate check identifier corresponding to the DRB 1 is an air interface parameter 1, and a candidate air interface parameter corresponding to the DRB 3 is an air interface parameter 2. It should be understood that the format index, the DRB identifiers, a quantity of air interface parameters, and the numbers of the air interface parameters in Table 9 are merely for reference, and the scope of this embodiment of the present invention is apparently not limited thereto.

TABLE 9

Schematic content indicated by the downlink configuration information
Content of the downlink configuration information
Format index 3

| | |
|---|---|
| DRB 1 | numerology 1 |
| DRB 3 | numerology 2 |
| ... | |

Based on the content of the downlink configuration information shown in Table 9, after receiving the downlink configuration information, a terminal learns that a base station may add, to a downlink control message in the format 3, service data to be transmitted to the terminal. In addition, the terminal further learns that the service data may belong to the DRB 1 or the DRB 3, and the candidate air interface parameters respectively corresponding to these DRBs. Subsequently, if the terminal expects to obtain the service data, the terminal may separately attempt to receive the downlink control message in the detection regions, of the downlink control message, that are represented by the numerology 1 and the numerology 2, and does not need to consider a detection region, of the downlink control message, that is represented by another air interface parameter (for example, numerology 3). Assuming that the terminal receives the correct downlink control message in the detection region, of the downlink control message, that is represented by the numerology 1, the terminal not only can obtain the service data carried in the downlink control message, but also can determine, based on the numerology 1 and a correspondence between the DRB 1 and the numerology 1, that the service data belongs to the DRB 1. Therefore, a solution of the optional embodiment also helps further reduce computational overheads and reduce a service latency.

Embodiment 5

In this embodiment, a configuration, of a downlink control message, indicated by the downlink configuration information further includes: an identifier of a data radio bearer and a candidate starting index corresponding to the data radio bearer. The candidate starting index is used to determine a starting position in a detection region of the downlink control message, and service data carried in the downlink control message belongs to the data radio bearer.

It should be understood that, to reduce computational overheads for receiving the downlink control message, especially blind detection overheads, a candidate starting index may be allocated to a terminal in the detection region of the downlink control message. Different candidate starting indexes may represent different starting positions. The terminal may attempt to receive the downlink control message, in the detection region of the downlink control message, from the starting position represented by the candidate starting index, and does not need to perform an attempt in the entire detection region, so that the computational overheads can be reduced.

Table 10 schematically provides a type of possible content indicated by the downlink configuration information in this embodiment of the present invention. As shown in Table 10, a type of possible content indicated by the downlink configuration information includes: a format index (a format index 1) of one downlink control message, identifiers (a DRB 2 and a DRB 4) of two data radio bearers, and two candidate starting indexes. A candidate starting index corresponding to a DRB 1 is a starting index 1, and a candidate starting index corresponding to a DRB 3 is a starting index 2. It should be understood that the format index, the DRB identifiers, a quantity of starting indexes, and the numbers of the starting indexes in Table 10 are merely for reference, and the scope of this embodiment of the present invention is apparently not limited thereto.

TABLE 10

Schematic content indicated by the downlink configuration information
Content of the downlink configuration information
Format index 1

| | |
|---|---|
| DRB 2 | Starting index 1 |
| DRB 4 | Starting index 2 |
| ... | |

Based on the content of the downlink configuration information shown in Table 10, after receiving the downlink configuration information, the terminal learns that a base station may add, to a downlink control message in the format 1, service data to be transmitted to the terminal. In addition, the terminal further learns that the service data may belong to the DRB 2 or the DRB 4, and the candidate starting indexes respectively corresponding to these DRBs. Subsequently, if the terminal expects to obtain the service data, the terminal may separately attempt to receive the downlink control message, from starting positions represented by the starting index 1 and the starting index 2, and does not need to perform an attempt in the entire detection region of the downlink control message. In addition, assuming that the terminal receives the correct downlink control message, from the starting position represented by the starting index 1, the terminal not only can obtain the service data carried in the downlink control message, but also can determine, based on the starting index 1 and a correspondence between the DRB 2 and the starting index 1, that the service data belongs to the DRB 2. Therefore, a solution of the optional embodiment also helps further reduce the computational overheads and reduce a service latency.

Embodiment 6

In this embodiment, a configuration, of a downlink control message, indicated by the downlink configuration information further includes: an identifier of a data radio bearer and a candidate quantity of detection times corresponding to the data radio bearer. The candidate quantity of detection times is used to determine a maximum quantity of detection times of the downlink control message, and service data carried in the downlink control message belongs to the data radio bearer.

It should be understood that, to control a quantity of times a terminal attempts to receive the downlink control message, the maximum quantity of detection times may be set for the terminal. In addition, for different DRBs, different maximum quantities of detection times may exist. As shown in Table 11-1, a candidate quantity of detection times corresponding to a DRB 4 is a quantity 1 of detection times, a candidate quantity of detection times corresponding to a DRB 6 is a quantity 2 of detection times, and the quantity 1 of detection times is different from the quantity 2 of detection times. Certainly, a same quantity of detection times may be configured for different DRBs. For example, the candidate quantities of detection times corresponding to the DRB 4 and the DRB 6 shown in Table 11-2 are both a quantity 3 of detection times. It should be understood that the quantity of detection times or the candidate quantity of detection times in this embodiment may be used as an example of the maximum quantity of blind decoding attempts in FIG. 3.

TABLE 11-1

Schematic content indicated by the downlink configuration information
Content of the downlink configuration information
Format index 6

| | |
|---|---|
| DRB 4 | Quantity 1 of detection times |
| DRB 6 | Quantity 2 of detection times |
| | ... |

TABLE 11-2

Schematic content indicated by the downlink configuration information
Content of the downlink configuration information
Format index 6

| | |
|---|---|
| DRB 4 | Quantity 3 of detection times |
| DRB 6 | |
| | ... |

Embodiment 7

It should be understood that, the foregoing Embodiment 2 to Embodiment 6 sequentially show corresponding combinations of an identifier of a data radio bearer with a candidate subframe, a candidate check identifier, a candidate air interface parameter, a candidate starting index, and a quantity of subsequent detections. In this embodiment of the present invention, in content indicated by downlink configuration information, corresponding combinations of the identifier of the data radio bearer with a plurality of parameters in the six parameters may simultaneously exist. For example, correspondences between the identifier of the data radio bearer and any two, any three, any four, any five, or all of the six parameters may simultaneously exist. In this embodiment, some combination modes are schematically shown with reference to Table 12 to Table 17. Apparently, the scope of this embodiment of the present invention is not limited to these combination modes.

Table 12 shows a type of possible content of the downlink configuration information, and the content may be used as an example of a combination of Embodiment 2 and Embodiment 3.

TABLE 12

Schematic content indicated by the downlink configuration information
Content of the downlink configuration information

| DRB identifier | Candidate subframe | Candidate check identifier |
|---|---|---|
| DRB 1 | Subframe 1 | Check identifier 1 |
| DRB 2 | Subframe 2 | Check identifier 2 |
| | Format index x | |
| | ... | |

Table 13 shows a type of possible content of the downlink configuration information, and the content may be used as an example of a combination of Embodiment 2 and Embodiment 4.

TABLE 13

Schematic content indicated by the downlink configuration information
Content of the downlink configuration information

| DRB identifier | Candidate subframe | Candidate air interface parameter |
|---|---|---|
| DRB 1 | Subframe 1 | numerology 1 |
| DRB 2 | Subframe 2 | numerology 2 |
| | Format index x | |
| | ... | |

Table 14 shows a type of possible content of the downlink configuration information, and the content may be used as an example of a combination of Embodiment 2, Embodiment 4, and Embodiment 5.

TABLE 14

Schematic content indicated by the downlink configuration information
Content of the downlink configuration information

| DRB identifier | Candidate subframe | Candidate air interface parameter | Candidate starting index |
|---|---|---|---|
| DRB 1 | Subframe 1 | numerology 1 | Starting index 1 |
| DRB 2 | Subframe 2 | numerology 2 | Starting index 2 |
| | Format index x | | |
| | ... | | |

Table 15 shows a type of possible content of the downlink configuration information, and the content may be used as an example of a combination of Embodiment 3, Embodiment 4, and Embodiment 5.

TABLE 15

Schematic content indicated by the downlink configuration information
Content of the downlink configuration information

| DRB identifier | Candidate check identifier | Candidate air interface parameter | Candidate starting index |
|---|---|---|---|
| DRB 1 | Check identifier 1 | numerology 1 | Starting index 1 |
| DRB 2 | Check identifier 2 | numerology 2 | Starting index 2 |
| | Format index x | | |
| | ... | | |

Table 16 shows another type of possible content of the downlink configuration information, and the content may be used as an example of mutual combinations of Embodiment 2 to Embodiment 5.

TABLE 16

Schematic content indicated by the downlink configuration information
Content of the downlink configuration information

| DRB identifier | Candidate subframe | Candidate check identifier | Candidate air interface parameter | Candidate starting index |
|---|---|---|---|---|
| DRB 1 | Subframe 1 | Check identifier 1 | numerology 1 | Starting index 1 |
| DRB 2 | Subframe 2 | Check identifier 2 | numerology 2 | Starting index 2 |
| | | Format index x | | |
| | | ... | | |

Table 17 shows another type of possible content of the downlink configuration information, and the content may be used as an example of mutual combinations of Embodiment 2 to Embodiment 6.

TABLE 17

Schematic content indicated by the
downlink configuration information
Content of the downlink configuration information

| DRB identifier | Candidate subframe | Candidate check identifier | Candidate air interface parameter | Candidate starting index | Candidate quantity of detection times |
|---|---|---|---|---|---|
| DRB 1 | Subframe 1 | Check identifier 1 | numerology 1 | Starting index 1 | Quantity 1 of detection times |
| DRB 2 | Subframe 2 | Check identifier 2 | numerology 2 | Starting index 2 | Quantity 2 of detection times |
|  |  | Format index x |  |  |  |
|  |  | ... |  |  |  |

Figure 5:
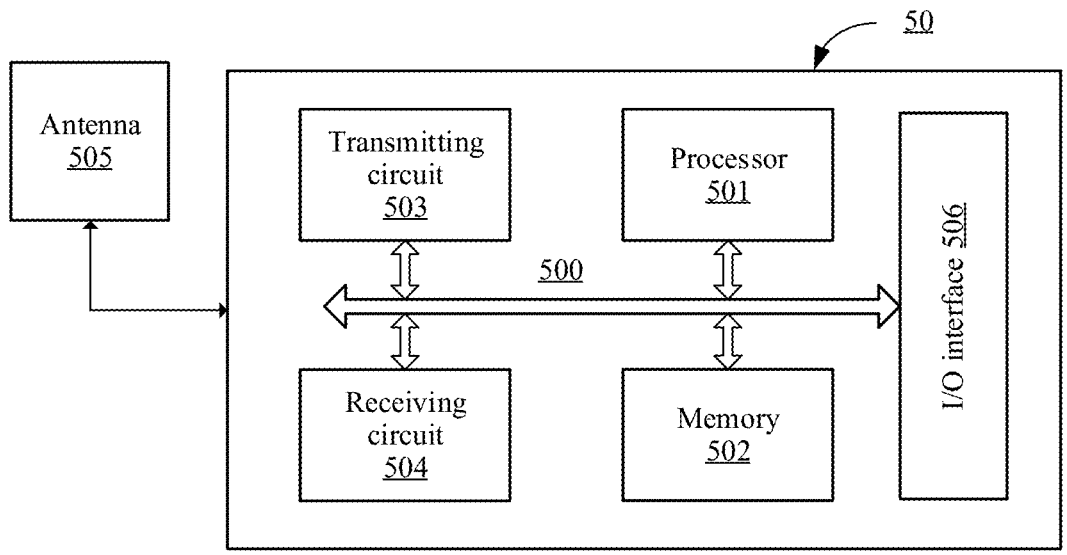
FIG. 5 is a schematic structural diagram of a wireless communications apparatus according to an embodiment of the present invention.

FIG. 5 is a schematic structural diagram of a wireless communications apparatus according to an embodiment of the present invention. The wireless communications apparatus may be the base station or the terminal in the wireless communications system in the embodiments of the present invention, and may implement the wireless communication method shown above in FIG. 3 and FIG. 4 and the foregoing optional embodiments. As shown in FIG. 5, a wireless communications apparatus 50 includes a processor 501 and a memory 502 connected to the processor 501. It should be understood that, although one processor and one memory are shown in FIG. 5, the wireless communications apparatus 50 may include another quantity of processors and memories.

The memory 502 is configured to store computer programs or computer instructions. The computer programs or instructions may be classified into two types based on functions. When one type of computer program or instruction is executed by the processor 501, the wireless communications apparatus 50 is enabled to implement the operations performed by the terminal in the wireless communication method in the embodiments of the present invention. This type of computer program or instruction may be denoted as a terminal function program. For example, the terminal function program may include program code for implementing the blind detection procedure shown in FIG. 3. When the other type of computer program or instruction is executed by the processor 501, the wireless communications apparatus 50 is enabled to implement the operations performed by the base station in the wireless communication method in the embodiments of the present invention. This type of computer program or instruction may be denoted as a base station function program.

In addition, the wireless communications apparatus 50 may further include: a connection line 500, a transmitting circuit 503, a receiving circuit 504, an antenna 505, an input/output (I/O) interface 506, and the like. The transmitting circuit and the receiving circuit may be coupled to the antenna, to connect to another communications device in a wireless manner. The transmitting circuit and the receiving circuit may alternatively be integrated into a transceiver, and the antenna may be a radio frequency antenna supporting a plurality of frequencies. The I/O interface allows the wireless communications apparatus 50 to interact with another communications device or a user. For example, for the base station, the I/O interface may be a common public radio interface (CPRI) interface, an Ethernet interface, a USB interface, or the like. For the terminal, the I/O interface may be a screen, a keyboard, a microphone, a speaker, a USB interface, or the like. Components inside the wireless communications apparatus 50 may be coupled together by using various connection lines (for example, a bus system). In addition to a data bus, the bus system may further includes a power bus, a control bus, a status signal bus, and the like. However, for clear description, various types of buses in this specification are marked as the bus system.

It should be understood that, in this embodiment of the present invention, when the memory 501 stores the terminal function program, the wireless communications apparatus 50 may be the terminal in the wireless communications system in the embodiments of the present invention. When the memory 501 stores the base station function program, the wireless communications apparatus 50 may be the base station in the wireless communications system in the embodiments of the present invention.

Figure 6:
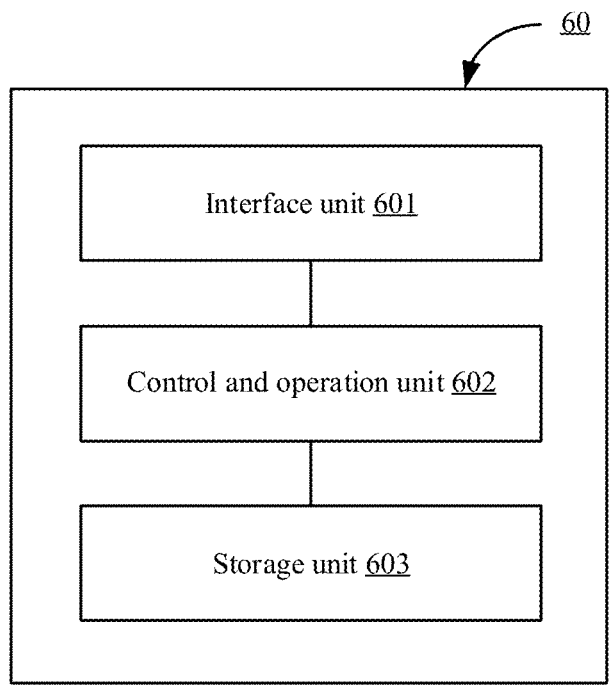
FIG. 6 is another schematic structural diagram of a wireless communications apparatus according to an embodiment of the present invention.

FIG. 6 is another schematic structural diagram of a wireless communications apparatus according to an embodiment of the present invention. The wireless communications apparatus may be a processor. The processor may be represented as a chip or a system-on-a-chip (SOC), and is disposed in the base station or the terminal in the wireless communications system in the embodiments of the present invention, so that the base station or the terminal implements a wireless communication method in the embodiments of the present invention, for example, the wireless communication method shown in FIG. 3 and FIG. 4, and the wireless communication method combined with the foregoing optional embodiments. As shown in FIG. 6, a wireless communications apparatus 60 includes an interface unit 601, a control and operation unit 602, and a storage unit 603. The interface unit is configured to connect to another component of the base station or the terminal, the storage unit 603 is configured to store a computer program or instruction, and the control and operation unit 602 is configured to decode and execute the computer program or instruction. It should be understood that the computer program or instruction may include the foregoing terminal function program, or may include the foregoing base station function program. When the terminal function program is decoded and executed by the control and operation unit 602, the terminal is enabled to implement functions of the terminal in the wireless communication method in the embodiments of the present invention. When the base station function program is decoded and executed by the control and operation unit 602, the base station is enabled to implement functions of the base station in the wireless communication method in the embodiments of the present invention.

In one embodiment, the terminal function program or the base station function program is stored in a memory outside the wireless communications apparatus 60. When the terminal function program or the base station function program is decoded and executed by the control and operation unit 602, the storage unit 603 temporarily stores some or all content of the terminal function program, or temporarily stores some or all content of the base station function program.

In another embodiment, the terminal function program or the base station function program is stored in the storage unit 603 inside the wireless communications apparatus 60. When the storage unit 603 inside the wireless communications apparatus 60 stores the terminal function program, the wireless communications apparatus 60 may be disposed in the terminal in the wireless communications system in the embodiments of the present invention. When the storage unit 603 inside the wireless communications apparatus 60 stores the base station function program, the wireless communications apparatus 60 may be disposed in the base station in the wireless communications system in the embodiments of the present invention.

In still another embodiment, some content of the terminal function program or the base station function program is stored in a memory outside the wireless communications apparatus 60, and some other content of the terminal function program or the base station function program is stored in the storage unit 603 inside the wireless communications apparatus 60.

Figure 7:
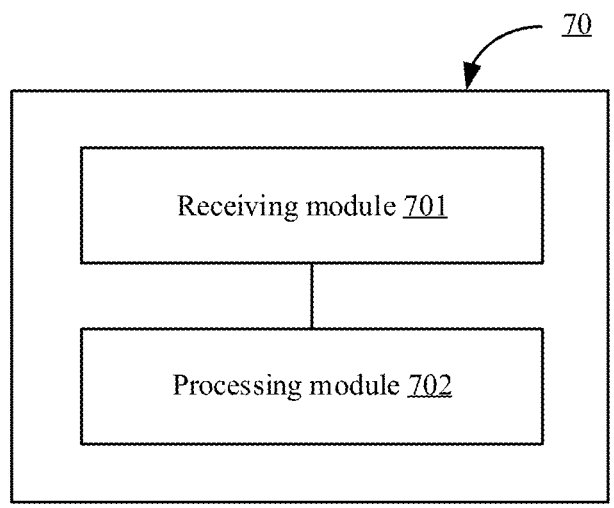
FIG. 7 is a schematic structural diagram of a wireless communications apparatus according to an embodiment of the present invention.
Figure 8:
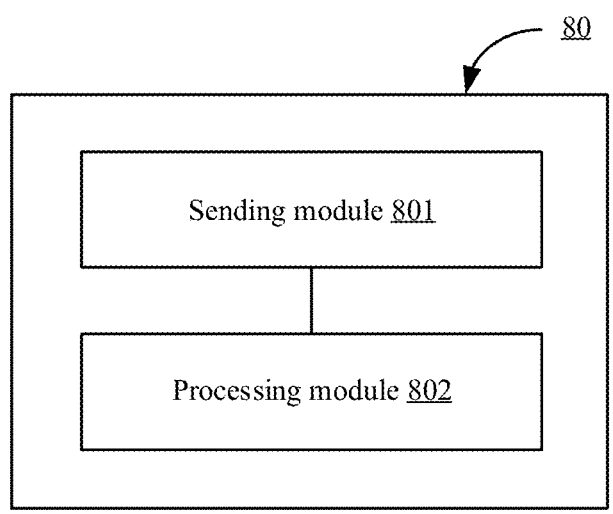
FIG. 8 is another schematic structural diagram of a wireless communications apparatus according to an embodiment of the present invention.

It should be understood that the wireless communications apparatus shown in FIG. 6 may be combined with the wireless communications apparatus shown in FIG. 5, FIG. 7, or FIG. 8. When the wireless communications apparatus 60 is a processor, the processor may be disposed in the terminal or the base station shown in FIG. 5, FIG. 7, or FIG. 8.

FIG. 7 is a schematic structural diagram of a wireless communications apparatus according to an embodiment of the present invention. The wireless communications apparatus may be the terminal in the wireless communications system in the embodiments of the present invention. As shown in FIG. 7, the wireless communications apparatus 70 includes a receiving module 701 and a processing module 702. The receiving module 701 and the processing module 702 cooperate with each other to:

receive downlink configuration information from a base station, where the downlink configuration information is used to indicate a configuration of a downlink control message, the configuration of the downlink control message includes a format of the downlink control message, and the downlink control message is used to carry service data to be transmitted to the terminal; and receive the downlink control message from the base station based on the configuration of the downlink control message.

It should be understood that the wireless communications apparatus 70 may be configured to implement the operations performed by the terminal in the wireless communication method in the embodiments of the present invention. For a related feature, refer to the foregoing. Details are not described herein again.

In one embodiment, the receiving module 701 may be a receiver, a receiving circuit, a transceiver, or a transceiver circuit, and the processing module 702 may be a processor. In one embodiment, the receiving module 701 and the processing module 702 may be software modules. In one embodiment combining software and hardware, the receiving module 701 may be a combination of a software module and one of a receiver, a receiving circuit, a transceiver, and a transceiver circuit. The processing module 702 may be a combination of a processor and a software module. In another embodiment, the receiving module 701 and the processing module 702 described above may be further combined to form a new embodiment.

FIG. 8 is a schematic structural diagram of a wireless communications apparatus according to an embodiment of the present invention. The wireless communications apparatus may be the base station in the wireless communications system in the embodiments of the present invention. As shown in FIG. 8, a wireless communications apparatus 80 includes a sending module 801 and a processing module 802. The sending module 801 and the processing module 802 are connected to each other, and the sending module 801 is configured to:

send downlink configuration information to a terminal, where the downlink configuration information is used to indicate a configuration of a downlink control message, the configuration of the downlink control message includes a format of the downlink control message, and the downlink control message is used to carry service data to be transmitted to the terminal; and send the downlink control message to the terminal based on the configuration of the downlink control message.

It should be understood that the wireless communications apparatus 80 may be configured to implement the operations performed by the base station in the wireless communication method in the embodiments of the present invention. For a related feature, refer to the foregoing. Details are not described herein again.

In one embodiment, the sending module 801 may be a transmitter, a sending circuit, a transceiver, or a transceiver circuit, and the processing module 802 may be a processor. In one embodiment, the sending module 801 and the processing module 802 may be software modules. In one embodiment, the sending module 801 may be a combination of a software module and one of a receiver, a receiving circuit, a transceiver, and a transceiver circuit. The processing module 802 may be a combination of a processor and a software module. In another embodiment, the sending module 801 and the processing module 802 as described above may be further combined with each other to constitute a new embodiment.

In this application, a processor is a device or circuit with a computing and processing capability, and may be referred to as a chip or a central processing unit (CPU). The foregoing processor may be a general-purpose processor, a digital signal processor (DSP), an application-specific integrated circuit (ASIC), a field programmable gate array (FPGA) or another programmable logic device, a transistor logic device, a discrete hardware component, or a microprocessor. The processor may be integrated into a system-on-a-chip (SOC).

A memory is a device or circuit with a data or information storage capability, and may provide an instruction and data for a processor. The memory includes a read-only memory (ROM), a random access memory (RAM), a non-volatile random access memory (NVRAM), a programmable read-only memory, an electrically erasable programmable memory, a register, or the like.

It should be understood that the foregoing descriptions are specific implementations of the present invention, but are not intended to limit the protection scope of the present invention. In the foregoing schematic structural diagrams, only one logical function division is shown. During specific implementation, there may be other physical division manners. For example, a plurality of logic modules are represented as one physical module, or one logic module is split into a plurality of physical modules. Any equivalent modification or replacement readily figured out by a person of ordinary skill in the art shall fall within the technical scope disclosed in the present invention.

What is claimed is:
1. A wireless communication method, comprising:
receiving downlink configuration information from a base station, wherein the downlink configuration information is used to indicate a configuration of a downlink control message, the configuration of the downlink control message comprises a format of the downlink control message, and the downlink control message is used to carry service data to be transmitted to a terminal; and
receiving the downlink control message from the base station based on the configuration of the downlink control message, wherein the configuration, indicated by the downlink configuration information, of the downlink control message further comprises: an identifier of a data radio bearer and a candidate air interface parameter corresponding to the data radio bearer, wherein
the candidate air interface parameter is used to determine a detection region of the downlink control message, and the service data carried in the downlink control message belongs to the data radio bearer.

2. The method according to claim 1, wherein
some information fields of the downlink control message are used to carry the service data to be transmitted to the terminal, and another information field of the downlink control message is used to carry layer 1 or layer 2 control signaling.

3. The method according to claim 2, wherein
the layer 1 or layer 2 control signaling carried in the another information field of the downlink control message comprises an identifier of a data radio bearer, and the service data carried in the downlink control message belongs to the data radio bearer.

4. The method according to claim 1, wherein
the configuration, indicated by the downlink configuration information, of the downlink control message further comprises: the identifier of the data radio bearer and a candidate subframe corresponding to the data radio bearer, wherein
the candidate subframe is used to transmit the downlink control message, and the service data carried in the downlink control message belongs to the data radio bearer.

5. The method according to claim 1, wherein
the configuration, indicated by the downlink configuration information, of the downlink control message further comprises: the identifier of the data radio bearer and a candidate check identifier corresponding to the data radio bearer, wherein
the candidate check identifier is used to check the downlink control message, and the service data carried in the downlink control message belongs to the data radio bearer.

6. The method according to claim 1, wherein
the configuration, indicated by the downlink configuration information, of the downlink control message further comprises: the identifier of the data radio bearer and a candidate starting index corresponding to the data radio bearer, wherein
the candidate starting index is used to determine a starting position of the detection region of the downlink control message, and the service data carried in the downlink control message belongs to the data radio bearer.

7. The method according to claim 1, wherein
the configuration, indicated by the downlink configuration information, of the downlink control message further comprises: the identifier of the data radio bearer and a candidate quantity of detection times corresponding to the data radio bearer, wherein
the candidate quantity of detection times is used to determine a maximum quantity of detection times of the downlink control message, and the service data carried in the downlink control message belongs to the data radio bearer.

8. A wireless communications apparatus, comprising:
a processor and a receiver connected to the processor, wherein the receiver is configured to:
receive downlink configuration information from a base station, wherein the downlink configuration information is used to indicate a configuration of a downlink control message, the configuration of the downlink control message comprises a format of the downlink control message, and the downlink control message is used to carry service data to be transmitted to a terminal; and
receive the downlink control message from the base station based on the configuration of the downlink control message, wherein
the configuration, indicated by the downlink configuration information, of the downlink control message further comprises: an identifier of a data radio bearer and a candidate air interface parameter corresponding to the data radio bearer, wherein
the candidate air interface parameter is used to determine a detection region of the downlink control message, and the service data carried in the downlink control message belongs to the data radio bearer.

9. The apparatus according to claim 8, wherein
some information fields of the downlink control message are used to carry the service data to be transmitted to the terminal, and another information field of the downlink control message is used to carry layer 1 or layer 2 control signaling.

10. The apparatus according to claim 9, wherein
the layer 1 or layer 2 control signaling carried in the another information field of the downlink control message comprises an identifier of a data radio bearer, and the service data carried in the downlink control message belongs to the data radio bearer.

11. The apparatus according to claim 8, wherein
the configuration, indicated by the downlink configuration information, of the downlink control message further comprises: the identifier of the data radio bearer and a candidate subframe corresponding to the data radio bearer, wherein
the candidate subframe is used to transmit the downlink control message, and the service data carried in the downlink control message belongs to the data radio bearer.

12. The apparatus according to claim 8, wherein
the configuration, indicated by the downlink configuration information, of the downlink control message further comprises: the identifier of the data radio bearer and a candidate check identifier corresponding to the data radio bearer, wherein
the candidate check identifier is used to check the downlink control message, and the service data carried in the downlink control message belongs to the data radio bearer.

13. The apparatus according to claim 8, wherein
the configuration, indicated by the downlink configuration information, of the downlink control message further comprises: the identifier of the data radio bearer and a candidate starting index corresponding to the data radio bearer, wherein
the candidate starting index is used to determine a starting position of the detection region of the downlink control message, and the service data carried in the downlink control message belongs to the data radio bearer.

14. The apparatus according to claim 8, wherein
the configuration, indicated by the downlink configuration information, of the downlink control message further comprises: the identifier of the data radio bearer and a candidate quantity of detection times corresponding to the data radio bearer, wherein the candidate quantity of detection times is used to determine a maximum quantity of detection times of the downlink control message, and the service data carried in the downlink control message belongs to the data radio bearer.

15. A computer-readable storage medium, comprising an instruction, wherein when the instruction is run on a computer, the computer is enabled to perform the operations of:

receiving downlink configuration information from a base station, wherein the downlink configuration information is used to indicate a configuration of a downlink control message, the configuration of the downlink control message comprises a format of the downlink control message, and the downlink control message is used to carry service data to be transmitted to a terminal; and receiving the downlink control message from the base station based on the configuration of the downlink control message, wherein the configuration, indicated by the downlink configuration information, of the downlink control message further comprises: an identifier of a data radio bearer and a candidate air interface parameter corresponding to the data radio bearer, wherein the candidate air interface parameter is used to determine a detection region of the downlink control message, and the service data carried in the downlink control message belongs to the data radio bearer.

16. The computer-readable storage medium according to claim 15, wherein some information fields of the downlink control message are used to carry the service data to be transmitted to the terminal, and another information field of the downlink control message is used to carry layer 1 or layer 2 control signaling.

17. The computer-readable storage medium according to claim 16, wherein the layer 1 or layer 2 control signaling carried in the another information field of the downlink control message comprises an identifier of a data radio bearer, and the service data carried in the downlink control message belongs to the data radio bearer.

18. The computer-readable storage medium according to claim 15, wherein the configuration, indicated by the downlink configuration information, of the downlink control message further comprises: the identifier of the data radio bearer and a candidate subframe corresponding to the data radio bearer, wherein the candidate subframe is used to transmit the downlink control message, and the service data carried in the downlink control message belongs to the data radio bearer.

* * * * *